United States Patent [19]

Sharkey

[11] 4,399,738
[45] Aug. 23, 1983

[54] VENTILATING STRUCTURE FOR GREENHOUSE

[76] Inventor: Arlis F. Sharkey, 705 Henriette St., Crivitz, Wis. 54114

[21] Appl. No.: 220,837

[22] Filed: Dec. 29, 1980

[51] Int. Cl.³ ............................................. F24F 13/10
[52] U.S. Cl. ............................................ 98/32; 47/17; 98/41 R; 251/61.1
[58] Field of Search .................. 47/17; 49/477; 98/32, 98/35, 37, 41 R, 42 A; 251/5, 61.1

[56] References Cited

U.S. PATENT DOCUMENTS

| | | | |
|---|---|---|---|
| 1,070,434 | 8/1913 | Farquhar | 47/17 X |
| 2,046,660 | 7/1936 | Atkinson | 47/17 |
| 2,598,207 | 5/1952 | Bailey et al. | 98/41 R |
| 2,601,423 | 6/1952 | Allman et al. | 98/42 |
| 2,856,835 | 10/1958 | Horne | 98/42 |
| 3,010,692 | 11/1961 | Jentoft | 251/61 |
| 3,063,195 | 11/1962 | Ravich | 47/17 |
| 3,213,776 | 10/1965 | Adams | 98/42 |
| 3,320,750 | 5/1967 | Haise et al. | 251/61.1 X |
| 3,556,465 | 1/1971 | Little | 251/61.1 |
| 3,677,164 | 7/1972 | Traver et al. | 98/41 R X |
| 3,869,826 | 3/1975 | Fischer | 47/17 |
| 4,055,030 | 10/1977 | Earnshaw | 52/86 |
| 4,250,941 | 2/1981 | McNally | 49/477 X |

Primary Examiner—Albert J. Makay
Assistant Examiner—Harold Joyce
Attorney, Agent, or Firm—Leo Gregory

[57] ABSTRACT

This invention relates to an improvement in the ventilation of a greenhouse and it consists of an elongated tubular inflatable member mounted to underlie an air vent extending along the ridge portion of the greenhouse and a second vent consisting of an elongated opening in the side wall of the greenhouse, each of the vents having an inflatable tubular member carried adjacent thereto whereby the inflatable members in deflatable condition permit the circulation of outside air from the side vent through the ridge vent and an air pump having a line running to each of the inflatable members inflating the same to seal the vents.

3 Claims, 2 Drawing Figures

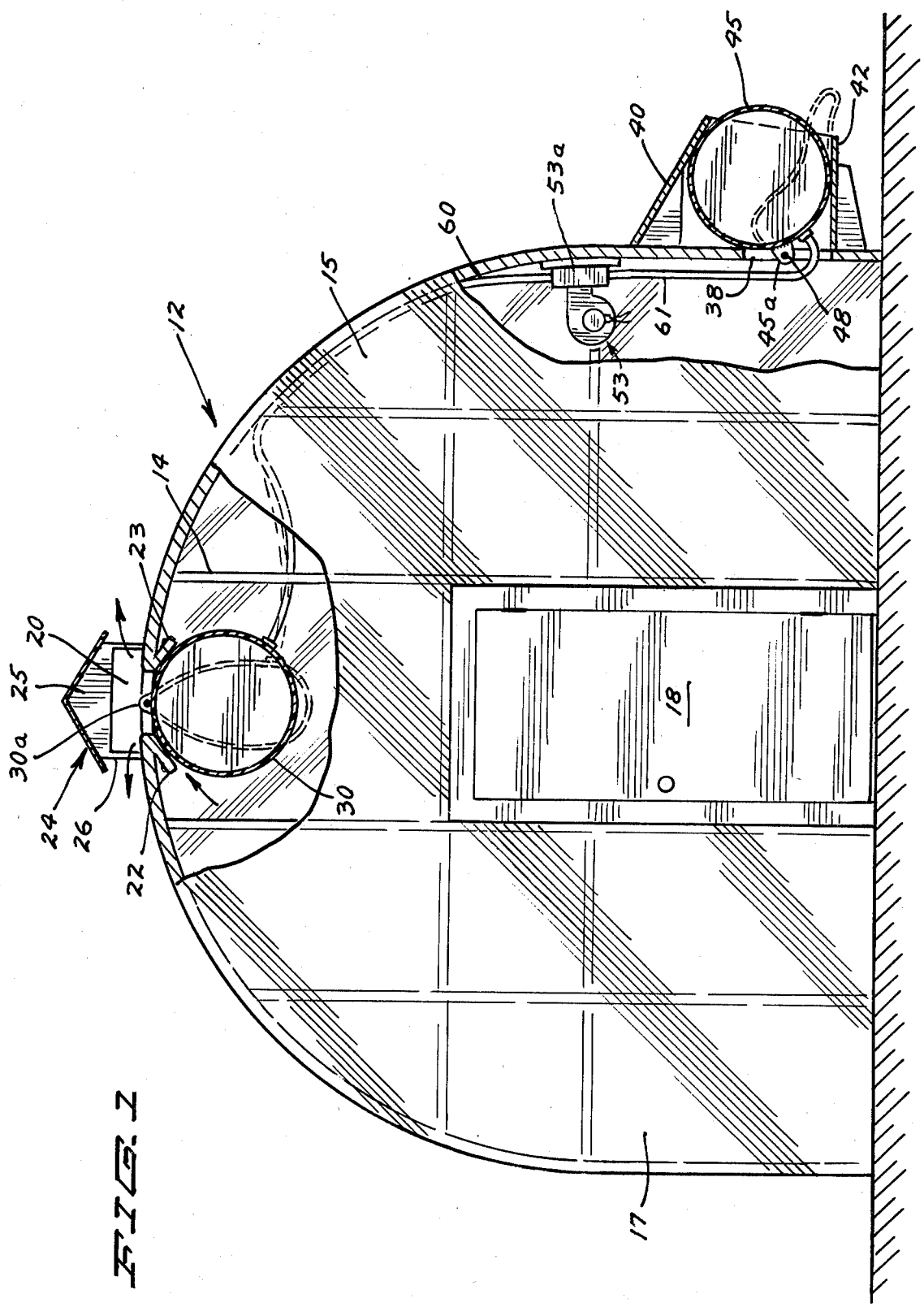

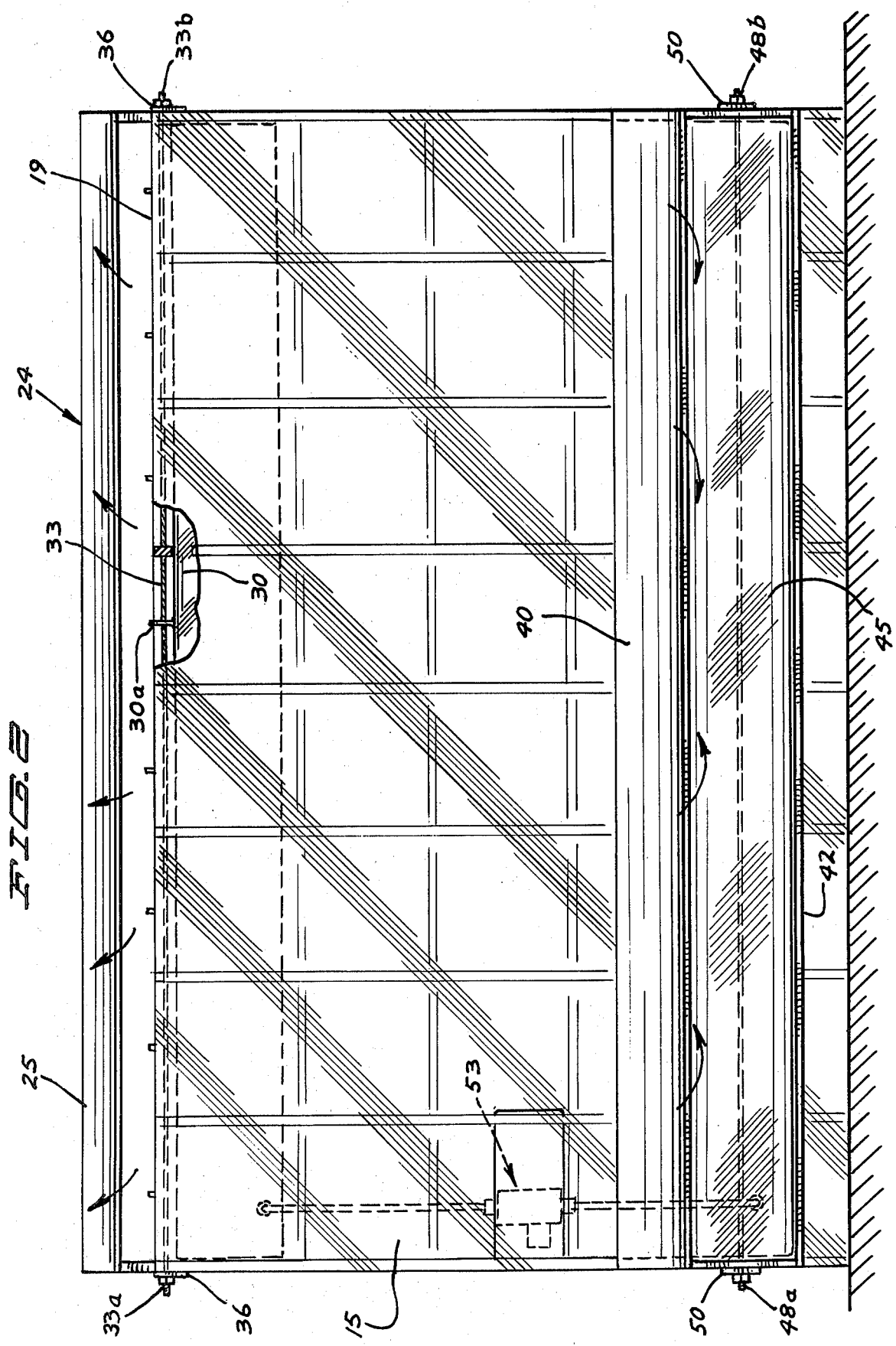

VENTILATING STRUCTURE FOR GREENHOUSE

SUMMARY OF THE INVENTION

1. Field of the Invention

This invention relates to inflatable means regulating air vents of a greenhouse.

2. Description of the Prior Art

It is a general practice in ventilating a greenhouse to have openings such as a ridge opening and in combination therewith side wall openings to provide air flow and it is a common practice to use pivoted shutters or baffles which are adjusted separately or cooperatively to control air flow or to seal off the entrance of outside air.

BACKGROUND OF THE INVENTION

The invention herein relates to a simple, relatively inexpensive and easily operated means to provide and control ventilation in connection with a greenhouse.

It is an object of this invention to provide in connection with an air vent in a greenhouse, an inflatable member to control the air flow through said vent or to seal said vent.

It is a further object of the invention herein to provide in connection with a greenhouse a ridge vent and a side wall vent to induce air flow and have mounted adjacent said vents inflatable members having a common air supply for inflation of said members to adjust or close the vents.

More specifically it is an object of this invention to provide in connection with a greenhouse, a ridge vent and a side wall vent having a tubular inflatable member mounted adjacent each of said vents co-extensive therewith and arranged to seal said vents upon being inflated and a common air supply having lines running to said inflatable members.

These and other objects and advantages of the invention will be set forth in the following description made in connection with the accompanying drawings in which like reference characters refer to similar parts throughout the several views.

BRIEF DESCRIPTION OF THE DRAWINGS

FIG. 1 is a view in end elevation with a portion thereof broken away and portions being shown in dotted line in alternate position; and FIG. 2 is a view in side elevation with a portion broken away and some portions being shown in dotted line.

DESCRIPTION OF A PREFERRED EMBODIMENT

Referring to the drawings, the reference numeral 12 indicates generally a greenhouse structure comprising a commonly used rigid framework 14 as of tubular or angle members secured together as by welding and said structure being somewhat semi-circular or convex in cross section on the order of a Quonset and having a polyethylene skin 15 covering the framework. A door 18 is shown at the front end 17 of said structure.

A ridge vent 20 is formed in the ridge 19 of the structure 12 and in the present embodiment said vent is shown extending the full length of said structure 12 defined by a pair of parallel spaced elongated depending plate members 22 and 23 suitably secured to the adjacent framework.

Extending the full length of said ridge is a cap strip 24 overlying the vent 20 and having a solid roof 25 carried by special vertical supporting member 26 upstanding from adjacent portions of framework 14 said cap strip covers or protects the top exposure of said vent but has open sides for free passage of air.

Preferably said cap strip and plate members are formed of a fairly transparent material as not to unduly impede the passage of light, such as being formed of a corrugated colorless fiberglass. Said skin extends upwardly to each side of said ridge vent and is there suitably secured.

Underlying said vent 20 and disposed between said plate members 22 and 23 is a means to control the vent and is here shown as an inflatable closed end tubular venting control member 30 formed of a suitable plastic material such as of an appropriate gauge and durometer of polyvinyl chloride. Said tubular member may be suitably supported as by being suspended from a cable 33 in a suitable manner such as by having the cable extend through upstanding apertured ears 30a, as here shown, said ears being integral with said inflatable member and said cable being secured at its extended end portions 33a and 33b by appropriate clamp members 36 secured to adjacent framework members. Said cable may be supported suitably at intervals by suspension members carried by the framework.

Shown extending along the lower side wall 12a of said framework is a vent 38. Said vent is sheltered and somewhat contained by an inclined overlying projecting plate member 40 and an underlying plate number 42, said plate members being suitably supported by framework members.

A closed end inflatable tubular venting member 45 on the order of the member 30 is disposed between said plate members 40 and 42 to be adjacent to and co-extensive with said vent 38. Securing said member 45 as shown here is a cable 48 extending through projecting ears 45a as in connection with the member 30 and having its projected ends 48a and 48b secured by suitable clamps to adjacent framework as indicated at 50.

Mounted upon a convenient member of the frame structure 12 is a self-powered blower type fan and manifold assembly 53. A small squirrel cage type of fan delivering 75 CFM is of sufficient size to suitably inflate the members 30 and 45. Running from said manifold 53a are a pair of air lines 60 and 61 which will be suitably attached to said members 30 and 45.

Said fan may be manually or thermostatically operated as may be desired although neither is here shown, such operation being conventional.

OPERATION

With the air vent controlling means here shown as venting members 30 and 45, in deflated condition as indicated in FIG. 1 in dotted line, there is a free flow of air from the vent 38 through the ridge vent 20. It will be understood that the vent 38 is shown for the purpose of illustration and that there may be more than one such as may be required to provide adequate ventilation. With the blower inoperative, the vent members readily deflate.

The blower may be operated manually or automatically to control the extent of the vent openings by the degree of inflation of said vent control members 30 and 45 and with sufficient inflation to have engagement with their respective adjacent plate members, said vent control members 30 and 45 will seal the vents.

The control of regulation of the vent members 30 and 45 is simple and effective and avoids the extensive hardware required by prior art structures to install and operate mechanical shutters or baffles. The structure comprising the invention herein has been very satisfactory.

It will of course be understood that various changes may be made in form, details, arrangement and proportions of the parts without departing from the scope of the invention herein, which generally stated, consists in an apparatus capable of carrying out the objects above set forth, in the parts and combinations of parts disclosed and defined in the appended claims.

What is claimed is:

1. Inflatable air vent regulating means for a greenhouse, having in combination
a greenhouse structure convex in cross section having a ridge portion and side wall portions,
an air vent open to the atmosphere formed in said ridge portion,
an inflatable substantially tubular member having closed ends and being coextensive with said vent,
means mounting said tubular member adjacent said vent,
a pressurized air supply,
an air line running from said air supply to said tubular member to inflate the same,
a plate member depends inwardly of said greenhouse from each side of said vent and adjacent each side of said tubular member,
whereby said tubular member in inflated condition engages and seals against said plate members.

2. The structure of claim 1, wherein
said means comprises a unitary member coextensive with said vent.

3. The structure of claim 1, wherein
said means comprises a cable substantially centrally longitudinally of said vent extending through said tubular member.

* * * * *